(12) United States Patent
Neumann

(10) Patent No.: US 10,693,962 B1
(45) Date of Patent: Jun. 23, 2020

(54) LANGUAGE AND MECHANISM FOR MODELING AND EXPORTING STORAGE PLATFORM TOPOLOGIES, ATTRIBUTES, AND BEHAVIORS

(71) Applicant: EMC IP Holding Company LLC, Hopkinton, MA (US)

(72) Inventor: Bryan D. Neumann, Garner, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 423 days.

(21) Appl. No.: 14/975,072

(22) Filed: Dec. 18, 2015

(51) Int. Cl.
*H04L 29/08* (2006.01)
*H04L 12/24* (2006.01)

(52) U.S. Cl.
CPC .......... *H04L 67/1097* (2013.01); *H04L 41/12* (2013.01); *H04L 67/16* (2013.01)

(58) Field of Classification Search
CPC ..... H04L 67/1097; H04L 41/12; H04L 67/16; G06F 9/465; G06F 17/30; G06F 8/30
See application file for complete search history.

(56) References Cited

U.S. PATENT DOCUMENTS

| | | | | |
|---|---|---|---|---|
| 9,424,003 | B1* | 8/2016 | Neumann | G06F 8/30 |
| 10,581,971 | B2* | 3/2020 | Sun | H04L 43/08 |
| 2003/0167327 | A1* | 9/2003 | Baldwin | H04L 67/36 709/225 |
| 2004/0199513 | A1* | 10/2004 | Dobberpuhl | H04L 41/12 |
| 2005/0044530 | A1* | 2/2005 | Novik | G06F 17/30174 717/122 |
| 2005/0165826 | A1* | 7/2005 | Ho | G06F 16/972 |
| 2006/0116866 | A1* | 6/2006 | Suzuki | G06F 40/55 704/2 |
| 2007/0047279 | A1* | 3/2007 | Evans | G06F 9/541 365/1 |
| 2008/0065748 | A1* | 3/2008 | Brisse | H04L 29/06 709/220 |

(Continued)

FOREIGN PATENT DOCUMENTS

WO    WO2002095570 A2 *    1/2001    ............ G06F 9/41

OTHER PUBLICATIONS

U.S. Appl. No. 14/523,466, filed Oct. 24, 2014.

*Primary Examiner* — Wei Y Zhen
*Assistant Examiner* — Brahim Bourzik
(74) *Attorney, Agent, or Firm* — Van Pelt, Yi & James LLP

(57) ABSTRACT

Techniques of the present disclosure automatically generate middleware code to structure representations of raw output from a storage platform and make suitable the output for consumption by a client application. In one embodiment, a method receives a storage platform description expressed at least in part in a domain specific language, wherein the storage platform description describes a storage platform and programmatically generates, based at least in part on the storage platform description, middleware code configured to transform response data received from the storage platform to conform to a target third party data structure of a third party application with which the response data is associated. The storage platform description can include characteristics of the storage platform such as topology, attributes, alerts, metrics, and the like. Suitable code can be reused or repurposed to reduce the amount of code handwritten by a developer.

26 Claims, 6 Drawing Sheets

(56) References Cited

U.S. PATENT DOCUMENTS

| | | | |
|---|---|---|---|
| 2011/0126219 A1* | 5/2011 | Singh | G06F 9/50 |
| | | | 719/328 |
| 2013/0219064 A1* | 8/2013 | Zhang | H04W 4/00 |
| | | | 709/225 |
| 2014/0156258 A1* | 6/2014 | Suzuki | G06F 40/47 |
| | | | 704/3 |
| 2015/0026343 A1* | 1/2015 | Borges | H04L 67/10 |
| | | | 709/226 |

* cited by examiner

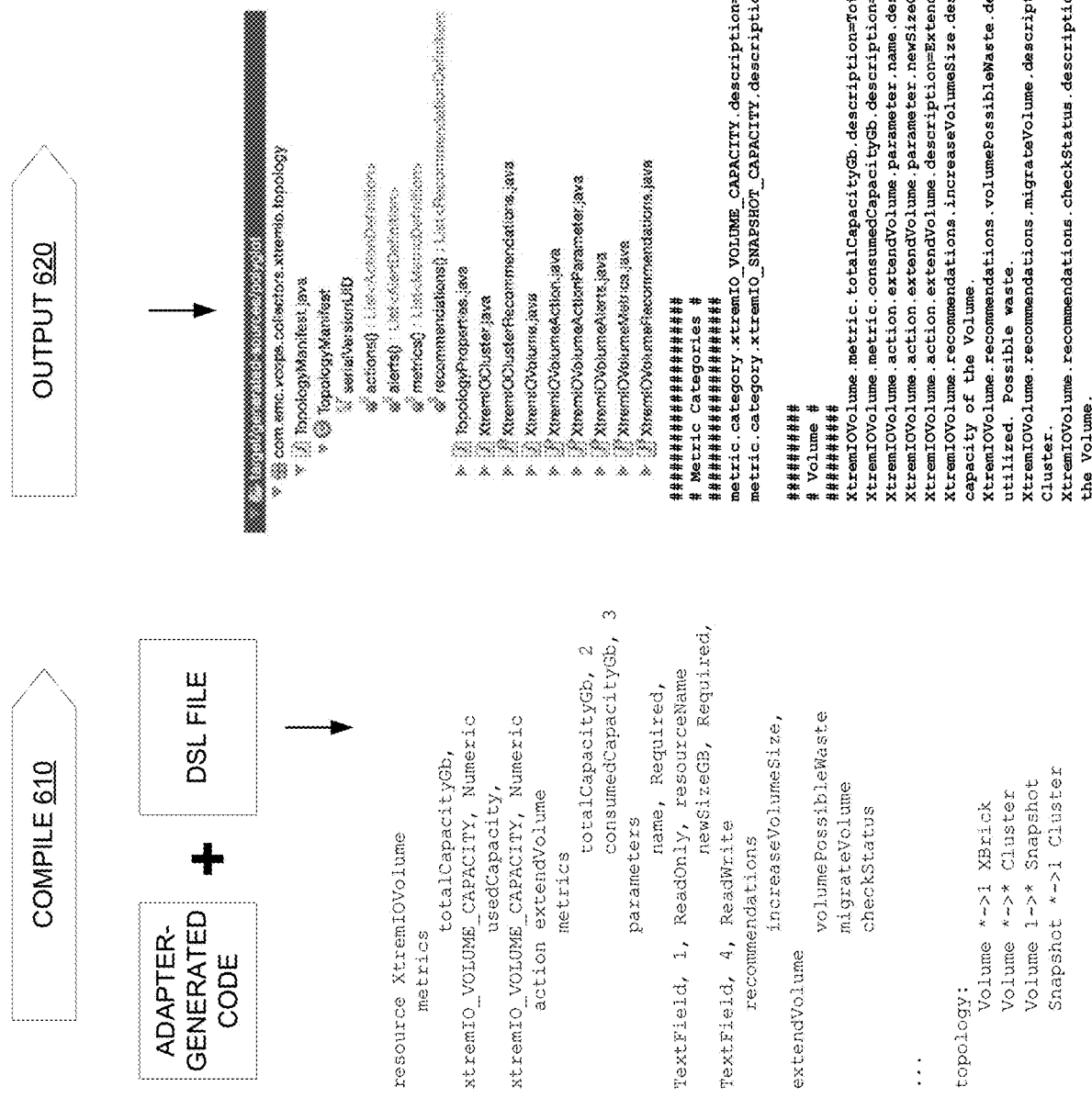

```
############
# resources #
############
metric-categories
        xtremIO_VOLUME_CAPACITY
        xtremIO_SNAPSHOT_CAPACITY

##########
# volume #
##########
resource XtremIOVolume
        metrics
                totalCapacityGb, xtremIO_VOLUME_CAPACITY, Numeric
                usedCapacity, xtremIO_VOLUME_CAPACITY, Numeric
        action extendVolume
                metrics
                        totalCapacityGb, 2
                        consumedCapacityGb, 3
                parameters
                        name, Required, TextField, 1, ReadOnly, resourceName
                        newSizeGB, Required, TextField, 4, ReadWrite
        recommendations
                increaseVolumeSize, extendVolume
                volumePossibleWaste
                migrateVolume
                checkStatus
        alerts
        ...
        symptoms
        ...

############
# Snapshot #
############

...

###########
# Cluster #
###########
resource XtremIOCluster
        recommendations
                freeCapacity
                extendCapacity
                unsubscribeCapacity
                hasPossibleWaste
                checkHealth

...

topology:
        Volume *->1 XBrick
        Volume *->* Cluster
        Volume 1->* Snapshot
        Snapshot *->1 Cluster
```

710 → (resources block)
720 → (volume block)
722 → metrics
724 → action extendVolume
728 → parameters
726 → recommendations
740 → Snapshot block
760 → Cluster block

```
##########################
# Metric Categories #
##########################
metric.category.xtremIO_VOLUME_CAPACITY.description=Capacity
metric.category.xtremIO_SNAPSHOT_CAPACITY.description=Capacity

##########
# Volume #
##########
XtremIOVolume.metric.totalCapacityGb.description=Total Capacity (GB)
XtremIOVolume.metric.consumedCapacityGb.description=Consumed Capacity in (GB)
XtremIOVolume.action.extendVolume.parameter.name.description=Name
XtremIOVolume.action.extendVolume.parameter.newSizeGb.description=New Size (GB)
XtremIOVolume.action.extendVolume.description=Extend Volume
XtremIOVolume.recommendations.increaseVolumeSize.description=Increase the capacity of the Volume.
XtremIOVolume.recommendations.volumePossibleWaste.description=Volume is not fully utilized. Possible waste.
XtremIOVolume.recommendations.migrateVolume.description=Migrate Volume to another Cluster.
XtremIOVolume.recommendations.checkStatus.description=Please check the status of the Volume.

############
# Snapshot #
############
XtremIOSnapshot.metric.totalCapacityGb.description=Total Capacity (GB)
XtremIOSnapshot.metric.consumedCapacityGb.description=Consumed Capacity in (GB)
XtremIOSnapshot.action.extendSnapshot.parameter.name.description=Name
XtremIOSnapshot.action.extendSnapshot.parameter.newSizeGb.description=New Size (GB)
XtremIOSnapshot.action.extendSnapshot.description=Extend Snapshot
XtremIOSnapshot.recommendations.increaseSnapshotSize.description=Increase the capacity of the Snapshot.
XtremIOSnapshot.recommendations.snapshotPossibleWaste.description=Snapshot is not fully utilized. Possible waste.
XtremIOSnapshot.recommendations.migrateSnapshot.description=Migrate Snapshot to another Cluster.
XtremIOSnapshot.recommendations.checkStatus.description=Please check the status of the Snapshot.

###########
# Cluster #
###########
XtremIOCluster.recommendations.freeCapacity.description=Free capacity from Cluster.
XtremIOCluster.recommendations.extendCapacity.description=Extend the capacity of Cluster.
XtremIOCluster.recommendations.unsubscribeCapacity.description=Reduce subscribed capacity of Cluster.
XtremIOCluster.recommendations.hasPossibleWaste.description=Cluster is not fully utilized. Possible waste.
XtremIOCluster.recommendations.checkHealth.description=Please check the health of the Cluster.

######################
# Storage Controller #
######################
XtremIOStorageController.recommendations.checkHealth.description=Please check the health of the Storage Controller.

#######
# SSD #
#######
XtremIOssd.recommendations.replace.description=Replace the SSD.
```

802

LANGUAGE AND MECHANISM FOR MODELING AND EXPORTING STORAGE PLATFORM TOPOLOGIES, ATTRIBUTES, AND BEHAVIORS

BACKGROUND OF THE INVENTION

Computer systems typically employ various hardware and software platforms with constituent systems and applications. The hardware and software platforms interface and communicate with one another to carry out operations. The systems and applications may use different languages and communications protocols and be unable to communication directly with each other. Custom middleware tailored to each system and/or application translates information between the different languages and communications protocols to allow the various systems and applications to communicate with one another. Creating the custom middleware is resource intensive, typically involving handwriting many lines of middleware code. Moreover, when systems and applications are upgraded, the middleware code may sometimes need to be rewritten. Thus, there exists a need in the art for efficient and effective middleware.

BRIEF DESCRIPTION OF THE DRAWINGS

Various embodiments of the invention are disclosed in the following detailed description and the accompanying drawings.

FIG. 6 illustrates an embodiment of a method for modeling and exporting information about a storage platform.

FIG. 7 illustrates an example of a domain-specific language file for modeling and exporting information about a storage platform.

FIG. 8 illustrates an example of generated properties code for modeling and exporting information about a storage platform.

DETAILED DESCRIPTION

The invention can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Although the following description uses the example of storage platforms, the described techniques find application in other types of computing involving middleware.

In the context of storage platform analytics, the middleware interfaces between a storage platform and an application handles queries by the application for storage platform information. Information about the storage platform serve various purposes, depending on the application. For example, the application can perform storage analytics, migrate legacy storage systems, or recover from a disaster such as a power outage. To perform these functions, the application requests different types of information from the underlying storage platform. Accordingly, the application can query the storage platform for storage-resource topology, relationships between storage resources, related actions, metrics, alerts, and attributes, and the like.

Figure 1:
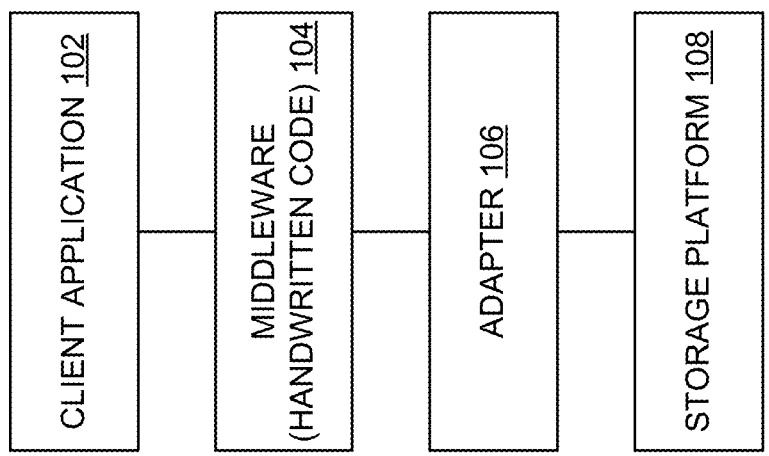
FIG. 1 illustrates a conventional system for modeling and exporting information about a storage platform.

FIG. 1 illustrates a conventional system 100 for modeling and exporting information about a storage platform. The system 100 includes a client application 102, middleware 104, an adapter 106, and a storage platform 108. The client application 102 can analyze a computer system including storage platforms of a computer system. The client application can access information from the storage platform via the middleware 104. The middleware 104 interfaces between the client application 102 and the storage platform 108. The middleware 104 can gather relevant information from the storage platforms via the adapter 106 in response to a request by the client application 102. In the conventional system 100, the middleware 104 is entirely implemented by handwritten code adapted to the particulars of the components to which the middleware interfaces (here, the client application 102 and the storage platform 108). The adapter 106 can parse and generate code from output of corresponding storage platforms. Information about the storage platform 108 can be processed by the adapter 106 before being made available to the middleware 104. The storage platform 108 stores data, which data can be stored in various formats and data structures, e.g., storage array. In some embodiments, the storage platform stores data usable by the client application 102 to provide analytics and perform other operations.

In operation, the client application 102 requests information about the storage platform 108. In some embodiments, the client application can process data directly output by the storage platform. In other embodiments, the client application can process data that has been pre-processed by the adapter 106. One type of pre-processing is as follows. The adapter annotates and parses output response objects from the storage platform and creates data structures for consumption by middleware. The adapter-generated code (also called "an intermediate representation") is then passed to custom-handwritten middleware 104, which converts the adapter-generated code to a format suitable for consumption by the client application 102.

The translation by the adapter 106 can proceed as follows. At development time, a model is created by hand (not shown). At runtime, the client application 102 queries ports of the storage platform 108 with a goal of obtaining information that is intelligible to the client application 102. For example, the query can be in the form of an API call for viewing all file systems on the storage platform 108. In response, the storage platform 108 outputs raw data such as a port name, port ID, topology, etc. The raw data can be of various formats including JSON, XML, etc. In this way, the middleware 104 can request collection of information about the storage platform 108 without parsing data at that level.

Conventional storage platform modeling and export systems such as the system 100 do not tailor representations of a storage platform to an application. In this regard, conventional storage platform export systems show a common representation of a given storage platform and a mechanism for interacting with that platform without regard for the client application's purposes, e.g. storage management, analytics, disaster recovery, etc. However, the common information presented is often inadequate for the particular context of the application. That is, information relevant for storage management and disaster recovery is different. This common information also does not allow for code reuse as the data structures used between third-party applications are incompatible. Conventionally, the common information is made useful by handwriting custom middleware code, which is laborious.

Techniques of the present disclosure automatically generate and update middleware code to accommodate a variety of system components, including changes to system components. In one aspect, a domain specific language (DSL) is developed and used to define a customizable representation of a storage platform. The customizable representation of the storage platform can include characteristics of the storage platform such as topology, attributes, alerts, metrics, and the like. A client application can, with the assistance of middleware as further described herein, query a storage platform for the customizable representation. In another aspect, the generated middleware code can be implemented as generic source code that accommodates different inputs and types of components. Suitable code can be reused or repurposed to reduce the amount of code handwritten by a developer. As further described herein, techniques of the present disclosure leverage opportunities in the middleware layer for code reuse by identifying and automatically generating code usable by various applications.

The present techniques find application in a variety of situations including system analytics, disaster avoidance/recovery, legacy recovery/adaptation, etc. In each case, a client application can request a customizable representation of a storage platform. The techniques described herein address a problem rooted in computer technology, e.g., conveying information about a storage platform to a requesting application. The present techniques automate aspects of middleware implementation and reduce the amount of handwritten code to implement middleware.

Figure 2:
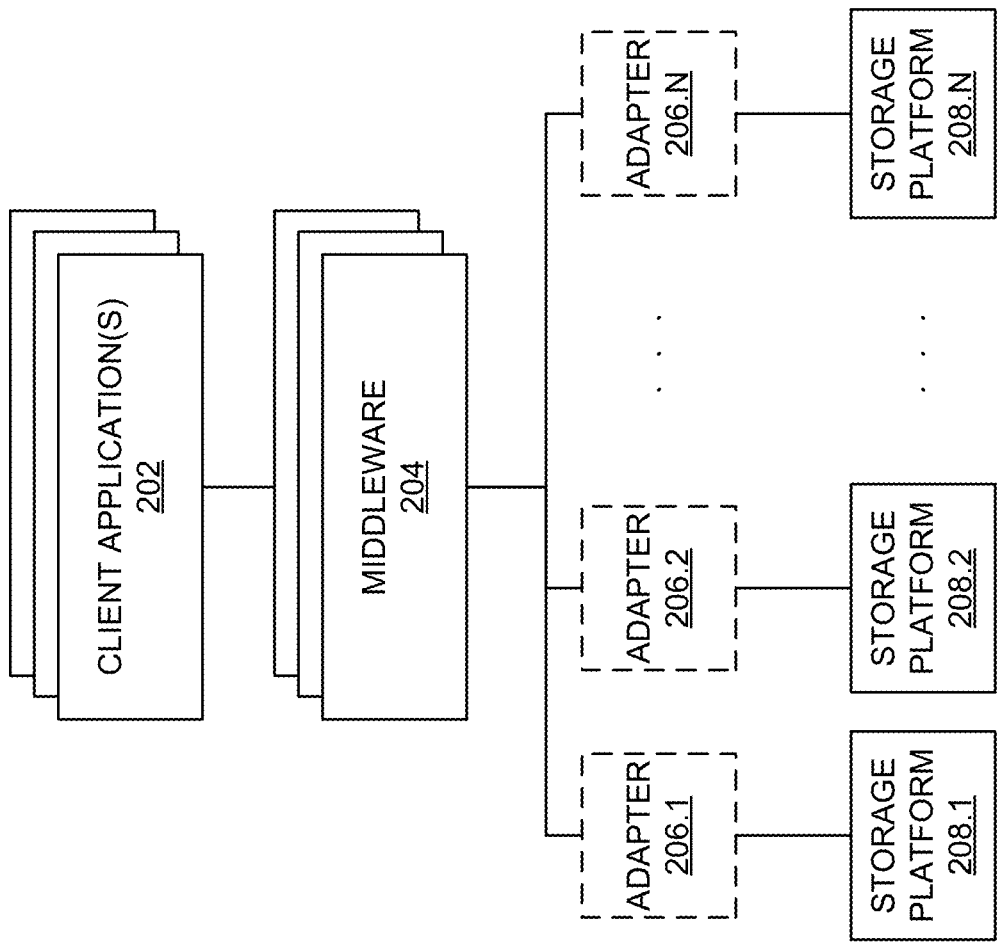
FIG. 2 illustrates an embodiment of a system for modeling and exporting information about one or more storage platforms.

FIG. 2 illustrates an embodiment of a system 200 for modeling and exporting information about one or more storage platforms 208.1-208.N. The system 200 includes one or more client applications 202, one or more instances of middleware 204, and one or more storage platforms 208.1-208.N. In some embodiments, the system 200 can include one or more adapters 206.1-206.N.

The client application(s) 202 can perform a variety of operations including analysis of a computer system and constituent storage platforms. The client application(s) can access information from the storage platform(s) via the middleware 204 according to the techniques described herein. The requested information can include statistics and topological information such as logical unit numbers, file systems, hardware specifications, etc. In some embodiments, the client application(s) interacts with a user. The client application(s) can present information about its content and/or receive input from the user using audio or visual signals on a user interface. Requests can be automatically made by an application based on a user, a schedule, as part of analytics, as part of another request such as a request to create a file system, and the like.

The middleware 204 interfaces between the client application(s) 202 and the storage platform(s) 208.1-208.N. The middleware can gather relevant information from the storage platforms via the adapter(s) 206.1-206.N in response to a request by the client application(s) 202. For example, the middleware can convert adapter output to a format compatible with the client application 102. The conversion can be performed according to the techniques described herein. In contrast to conventional middleware, which is entirely handwritten by a developer, the middleware 204 is implemented according to the techniques described herein to reduce the amount of handwritten code. Using the example of providing an alert, the middleware 204 recognizes an event, considers the resources involved, and generates the alert, if appropriate, without needing to pass on information about the specific storage platform.

The storage platform(s) 208.1-208.N store data, which data can be stored in various formats and data structures, e.g., collection of fields. In some embodiments, the storage platform(s) store data usable by the client application(s) 202 to provide analytics and perform other operations. One or more of the storage platform(s) 208.1-208.N can include different types, classes, and/or versions of storage systems and can supply responses in various formats. In some embodiments, the storage platform provides shared access to physical or virtual storage. For example, the storage can use a data storage virtualization technology such as RAID. The storage platform can store information about itself and its interaction with other systems. The information can be made available via a protocol such as HTTPS, SSH, or the like either with a proprietary (e.g., console output) or public exchange format (e.g., XML). The middleware 204 can generate code to convert the data of the storage platform(s) to an appropriate client application format according to the techniques described herein.

In some embodiments, the system 200 includes one or more adapters 206.1-206.N. The adapter(s) 206.1-206.N can include a process object (e.g., a "polyglot") that processes the raw data by annotating the raw data (e.g., changing a value of a field). The process object can include a raw model that generates code that can ingest live data from the storage platform 208. An output-specific parser can handle live output. The adapter-generated code can be output to the middleware 204 for processing as described herein. In other embodiments, the middleware 204 can process output directly from the storage platform or adapter-generated code pre-processed according to another method.

In operation, the client application(s) 202 may request information about the storage platform(s) 208.1-208.N. Based on the request, one or more instances of middleware 204 can issue a request formatted appropriately for the storage platform(s) 208.1-208.N. For example, the request can be formatted appropriate for particular types of classes of disks. In some embodiments, the middleware 204 can connect to the storage platform(s) 208.1-208.N via a respective adapter 206.1-206.N to obtain the requested information, as further described herein. The middleware 204 can receive information from the storage platform(s) and convert them to a format compatible with the client application, as further described herein.

Figure 3:
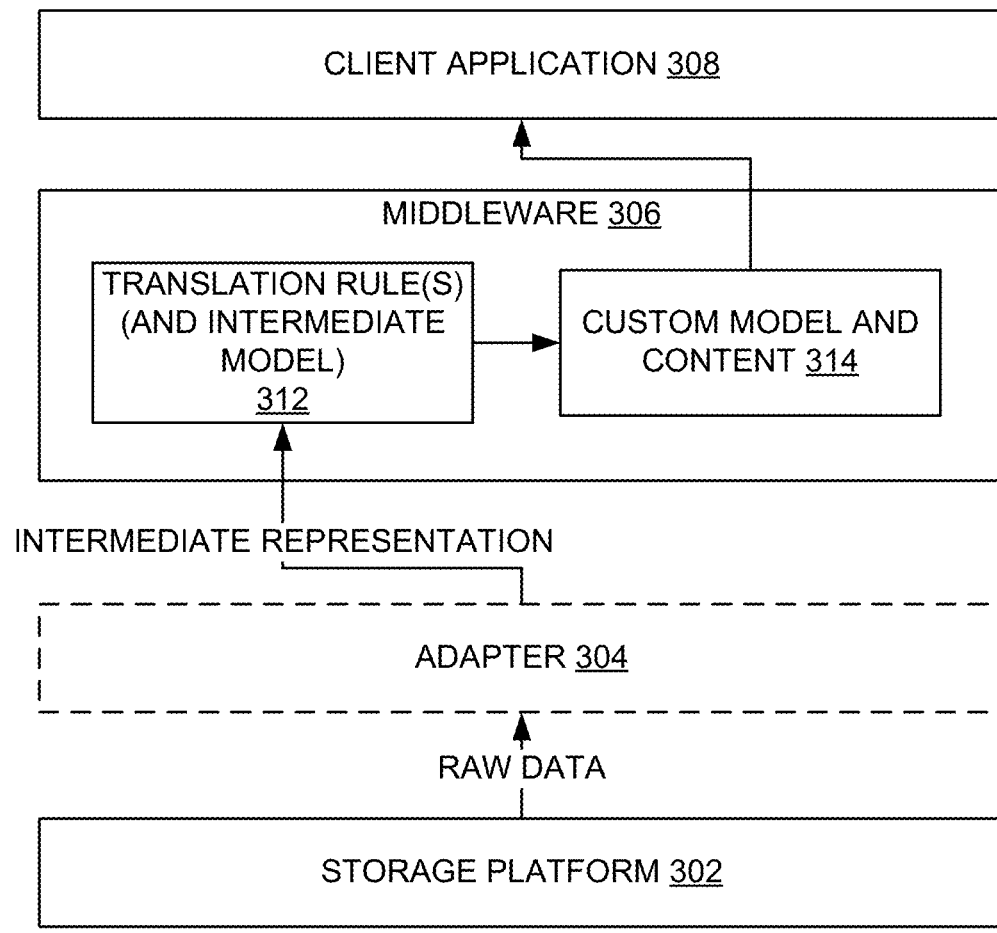
FIG. 3 illustrates an embodiment of a runtime system for modeling and exporting information about a storage platform.

FIG. 3 illustrates an embodiment of a runtime system 300 for modeling and exporting information about a storage platform. The system 300 includes a client application 308, middleware 306, an adapter 304, and a storage platform 302. The system 300 can be a system that processes live data during runtime.

The client application 308 can perform a variety of operations including analysis of a computer system and constituent storage platforms. The client application can access information from the storage platform 302 via the middleware 306 according to the techniques described herein. The requested information can include statistics and topological information such as logical unit numbers, file systems, hardware specifications, etc. In some embodiments, the client application interacts with a user. The client application can present information about its content and/or receive input from the user using audio or visual signals on a user interface. Requests can be automatically made by an application based on a user, a schedule, as part of analytics, as part of another request such as a request to create a file system, and the like.

The middleware 306 includes one or more translation rules 312. The translation rule(s) 312 can be applied to a received intermediate representation of an output of the storage platform 302. The intermediate representation of the output of the storage platform can be normalized version of raw data from the storage platform. The intermediate representation can be processed according to the techniques described herein and generate output 314 conforming to a custom model and content. This reduces the effort required to generate handwritten code because the content 314 conforming to a custom model and content can be generated automatically as further described herein. The translation rule(s) 312 and the content 314 are further described herein with respect to FIG. 4. As shown, in some embodiments, the middleware 306 includes an intermediate model, which is further described herein.

The middleware 306 re-assembles information from an adapter output. For example, if the client application 308 wants to see the relationship between disks/exports and file systems/exports, the middleware 306 formats adapter-output data accordingly. The requested relationships are not readily apparent in the adapter output, and is assembled by the middleware. That is, the middleware re-assembles adapter-generated code in a manner that is responsive to the query by the client application 308. In some embodiments, the middleware assembles a custom topology map. This way, the client application 308 receives the information in a desired format. For example, levels of details and perspectives may differ from application to application.

Depending on the kind of middleware 306 and the data received by the adapter 304, the middleware might use the information differently depending on its own purposes. For resources, certain things might be more interesting: metrics, alerts. At the middleware level, a description file defines what can be done based on the adapter-generated code. The description file is further described herein with respect to FIG. 7.

The storage platform 302 stores data, which data can be stored in various formats and data structures, e.g., collection of fields. In some embodiments, the storage platform stores data usable by the client application 302 to provide analytics and perform other operations. The storage platform 302 can include different types, classes, and/or versions of storage systems and can supply responses in various formats. The middleware 306 can generate code to convert the data of the storage platform to an appropriate client application format according to the techniques described herein.

In some embodiments, the system 300 includes an adapter 304. The adapter 304 can include a process object (e.g., a "polyglot") that processes the raw data by annotating the raw data (e.g., changing a value of a field) to generate a raw code model. The process object can include a raw model that generates code that can ingest live data from the storage platform 302. An output-specific parser can handle live output. The adapter-generated code can be output to the middleware 306 for processing as described herein. In other embodiments, the middleware 204 can process output directly from the storage platform or adapter-generated code pre-processed according to another method.

In operation, the storage platform 302 outputs raw data. The adapter 304 outputs an intermediate representation embodying a raw code model. The intermediate representation can be generated by the adapter in a variety of ways. The middleware 306 receives a raw code model and individual objects obtained from the adapter 304 and correlates the raw code model and objects to create representations of the raw model. An object can be a resource, a file system, a port on an array, or other logical element or physical element of a storage platform. Status and performance information obtained from the raw model are used to create a collection of alerts and metrics.

According to techniques of the present disclosure, correlation information is contained in a description file. That is, the resource kinds, their metrics, actions, alerts, etc. can be defined in the description file. The description file is further described herein with respect to FIGS. 4 and 7. The middleware 306 can programmatically generate, based on the intermediate representation, middleware code configured to transform response data received from the storage platform 302 to a target third party data structure of the client application 308 with which the response data is associated.

Using the example of downtime, an average downtime duration can be determined by the middleware 306 based on storage platform information. Each system (e.g., each storage platform) can report downtime, and the middleware can assemble the reported downtime to determine the average downtime.

One aspect of the integration effort by middleware 306 is exporting information about the storage platform 302 to formats (e.g., data structure(s)) intelligible to the client application 308. The exporting of information involves translating static information about an array of the storage platform 302 to dynamic information about the array of the storage platform 302. One example of exporting is defining a relationship between a volume and a storage pool. Another example of exporting is defining a volume's metrics for a given platform. The middleware 306 formats platform information to be intelligible and relevant to the context of that application. This context may include communication protocols, representations of resources, analytics, etc. appropriate for that application.

Although not shown, the components of the system 300 can be characterized as being part of different levels, where higher levels manipulate data that is more abstracted compared with lower levels. Although shown with the example of a single client application 308, middleware 306, adapter 304, and storage platform 312, the system 300 can include a plurality of each of these components, for example the system 300 can be implemented in combination with the system 200.

Figure 4:
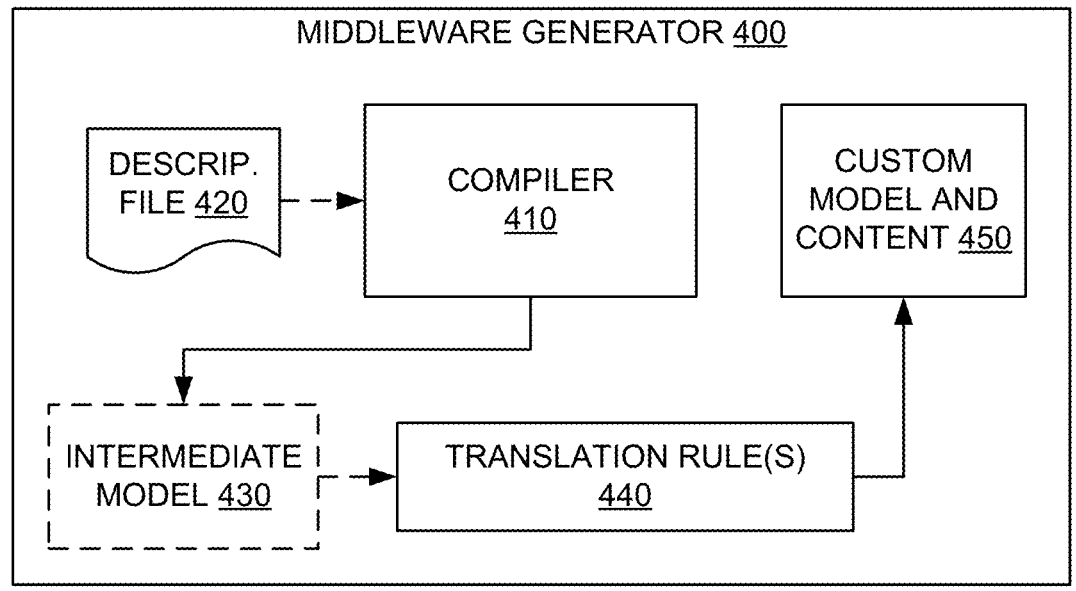
FIG. 4 illustrates an embodiment of a compile time system for modeling and exporting information about a storage platform.

FIG. 4 illustrates an embodiment of a compile time system 400 for modeling and exporting information about a storage platform. The system 400 (also referred to as a "middleware generator") can process data during compile time to systematically generate custom middleware. The middleware generator 400 can systematically generate custom middleware according to the techniques described herein. In some embodiments, the middleware generator 400 can be implemented using one or more hardware platforms. For example, functionality can be distributed across one or more hardware platforms. The system 400 includes a compiler 410. The compiler 410 can receive a description file 420 to generate code embodying a custom model and content 450. The description file 420 can be in a domain specific language, e.g., a topology file. For example, the compiler 410 creates class files that, along with translation-rule classes, automatically generates output 450 conforming to a custom model and content. The automatically generated output 450 replaces traditionally handwritten middleware code.

The description file 420 correlates adapter-generated code with object(s) output by a storage platform (e.g., the storage platform 302 shown in FIG. 3). The correlation can be used to create alerts and/or other metrics. Unlike conventional systems, which embed information such as resource definitions, relationships, metrics, alerts, etc. directly in the middleware code, the information is described in the description file 420. In other words, the description file is a source file for generating an intermediate model acting as an interlingua between a domain specific language and the target client application API data structures. The description file 420 includes translation rules 440, which is further described herein. In some embodiments, the description file is human-readable. In some embodiments, the description file is a single, authoritative file capturing the information. In some embodiments, the description file is a topology file (e.g., having .top extension). The description file enables concrete code that is generated to be quite different using a common description file.

The description file 420 can be generated from application-level or host-level information. For example, a developer such as a product manager can define information, e.g., resources needed for a particular situation. This can be described in natural language such as a bulleted list, spreadsheet, presentation file, etc. A developer can use this information to generate the description file. The description file is further described herein with respect to FIG. 7.

One type of description file is a topology file (".top file" for simplicity). A .top file can define a set of keywords for interpreting and correlating adapter-generated output. In some embodiments, the .top file can support regular expressions and provide custom data types. A topology file can include keywords, data about the topology, and metadata about the topology (e.g., resource type). In some embodiments, the .top file describes the topology of the storage platform. In some embodiments, the .top file describes information that the adapter could be providing, e.g. is expected to provide. In some embodiments, the .top file describes information expected to be received from an adapter (e.g., the adapter 304 shown in FIG. 3). A .top file can be specific to a particular middleware, e.g., one type of .top file is for analytics and another .top file is for disaster recovery.

The translation rule(s) 440 define how the middleware 400 exports information. In some embodiments, a translation rule translates multiple resources into a set of relationships. For example, a "raw volume" (a set of devices) can be translated to a volume with metrics and associated actions. A translation rule can include a class that defines how to export an instance of a generated class type into a data structure suitable for a requesting entity, e.g. a client application. For example, a translation rule can define how to export a storage pool class into a client application data structure. A translation rule defines a template applicable to generated types that transforms an intermediate model 430 into a custom model and content 450 suitable for the requesting client application. The translator classes themselves may be generated in the subsequently at compile time.

The custom model and content 450 represents content generated by the compiler 410. The custom model and content replaces traditionally handwritten code. In some embodiments, the custom model and content 450 is source code. In some embodiments, the custom model and content is responsive to the request made by the client application.

With this approach, a developer can quickly respond to new requirements by updating the .top file. The .top file can be compiled to automatically generate source code for the middleware. In one aspect, the .top file can be used to produce similar content for other third-party applications by changing translation rules. For example, when client applications change or storage platforms change, the .top file can be modified then compiled according to the techniques described herein to automatically generate middleware code usable at runtime to process live data.

In some embodiments, the middleware generator 400 includes an intermediate model 430. The intermediate model includes a set of rules to which a custom model and content adheres. The intermediate model represents a resource, e.g. a generic name of a concrete resource. The description file 420 can reference the intermediate model, and the custom model and content 450 can reference the intermediate model. The intermediate model facilitates examination of output of a topology file by allowing for the output of the topology file to be applied to other uses in the middleware. The intermediate model 430 can be generated by the compiler 410 based on the description file 420. The intermediate model includes representations of lower-level actions. In some embodiments, the intermediate model is developed at development time and available at runtime.

Figure 5:
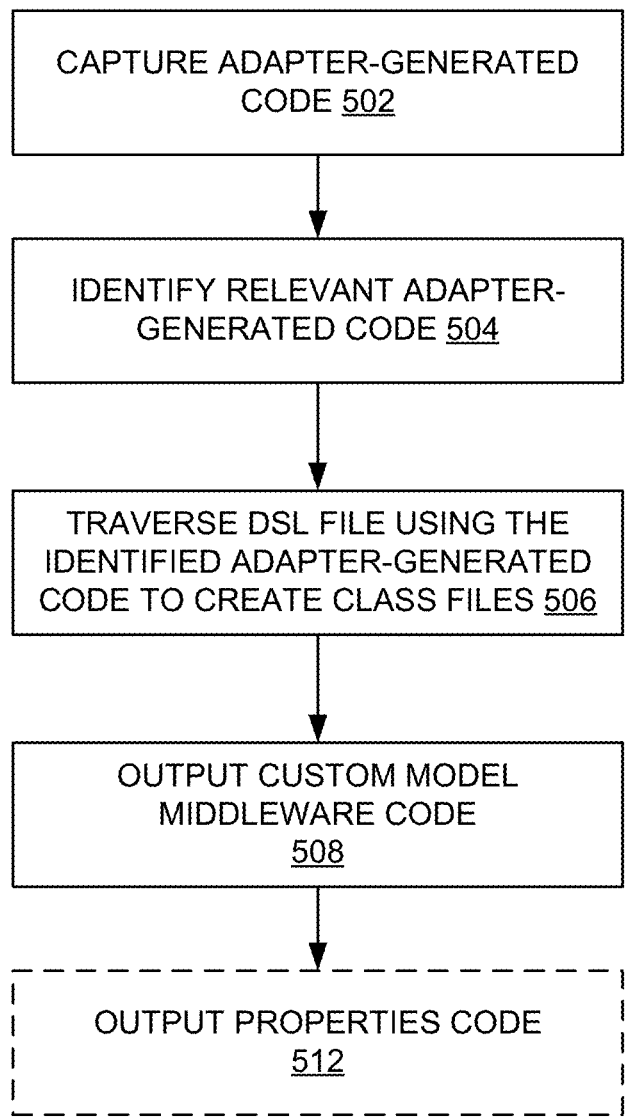
FIG. 5 illustrates an embodiment of a method for modeling and exporting information about a storage platform.

FIG. 5 illustrates an embodiment of a method 500 for modeling and exporting information about a storage platform. The method 500 can be performed by middleware such as the middleware 306 shown in FIG. 3.

In 502, the method 500 captures adapter-generated code. The adapter-generated code can be generated by an adapter according to techniques described herein. In some embodiments, the adapter-generated code is not intelligible to a client application requesting information about a storage platform.

The method 500 can then proceed to compile the adapter-generated code using a description file as follows. In 504, the method 500 identifies relevant adapter-generated code.

Adapter-generated code can be code useful for generating a response to query by a client application. Code that might be useful can be defined by a description file.

In 506, the method 500 traverses the description file using the identified adapter-generated code to create class files. In this way, the method 500 creates a representation of a raw model. The method 500 can create a representation of a raw model by correlating the raw model data with metrics defined in the description file. For example, middleware (e.g., the middleware 400 shown in FIG. 4) takes a raw code model and individual objects obtained from the adapters and correlates the raw code model and individual objects to create representations of the raw model. For example, status and performance information obtained from the raw model are used to create a collection of alerts and metrics. In some embodiments, the description file can be a topology file or the like as described herein.

In 508, the method 500 can output code embodying a custom model. The output code can be custom middleware code that interfaces the storage platform and the client application. The middleware code can be generated automatically, thus reducing the effort to handwrite code. In some embodiments, the method 500 includes outputting properties code. This can provide easier localization as described herein with respect to FIG. 8.

FIG. 6 illustrates an embodiment of a method 600 for modeling and exporting information about a storage platform. FIG. 6 shows example code corresponding to 504-512 of the method 500. In some embodiments, compile 610 corresponds to 504-506 of the method 500. Compile 610 can involve using adapter generated code and a description file ("DSL file" for simplicity), which is shown below compile 610. In some embodiments, output 620 corresponds to 508-512 of the method 500. A sample of compiled Java code for the middleware is shown below output 620. When the compiled code is executed on live data, for each instance of "disk" in a response object, corresponding key values can be substituted. Thus, the compiled code includes generic source code applicable to various disks in a storage platform. Below the compiled Java is example properties code that facilitates localization as further described herein.

FIG. 7 illustrates an example embodiment of a DSL file 700 (specifically a .top file) for modeling and exporting information about a storage platform. The file 700 can be used to generate custom middleware code. The generated middleware code is compatible with a client application (also referred to as a "third party application") and responsive to client application queries about storage platforms.

The file 700 includes a collection of resources 710. The example shown uses XtremIO® as the storage platform or volume. Other storage platforms are possible. In the example shown, the resources include (i) a volume identified as "xtremIO_VOLUME_CAPACITY" by resource ID and (ii) a snapshot identified as "xtremIO_SNAPSHOT_CAPACITY" by resource ID. The resources 710 may be those resources relevant to a client application. In the example shown, the volume and snapshot resources are associated with a client application. The resources can be an abstraction of underlying storage devices. For example, the volume 720 can be a collection of storage disks. In the topology file, the collection of disks can simply be referred to as a volume.

A resource can have various parameters associated with that resource. For volume ("XtremeIOVolume), various parameters 722-726 are shown. In the example shown, the parameters include metrics, actions, recommendations, alerts, symptoms, etc. In some embodiments, a metric 722 is listed with three descriptors: an ID, a category, and a type.

In the example shown, the metric identified by totalCapacityGb is of category xtremIO_VOLUME_CAPACITY and type Numeric. The metrics 722 can be defined in the DSL file or provided by an adapter. In some embodiments, at least some of the metrics can be representations of same information (e.g., volume). The metrics 722 can be referenced elsewhere in the DSL file. For example, an alert can be triggered if a capacity exceeds a threshold (not shown). The metrics are conventionally defined by hand. Techniques of the present disclosure provide for automatic definition of metrics, thus saving effort.

The actions 724 include actions associated with the resource. For example, an action can be performed using the resource or on the resource. In some embodiments, an action 724 is listed with two descriptors: an ID and a display order. In the example shown, metric identified by totalCapacityGb is of display order 2. In some embodiments, this means that the ID can be displayed second in a listing of various IDs. In the example shown, the action extendVolume 724 can be performed on the resource XtremIOVolume. The action expands the volume using the metrics by a defined amount or percentage. In an exemplary use case, a volume can be monitored over time. Upon satisfaction of one or more metrics (e.g., a percentage of the volume has been occupied), the volume can be extended. One type of volume-extending action is extending the size of the volume resource when a threshold percentage of the volume has been occupied. In the example shown, the metrics "totalCapacityGb" and "consumedCapacityGb" are used for the extendVolume action.

The parameters 728 can include parameters relevant to an action. In the example shown, the parameters 728 are associated with action extendVolume 724. In some embodiments, a parameter 728 is listed with six descriptors: an ID, a requirement, an inputMechanism, a displayOrder, an access indicator, and a default value. In the example shown, for parameter of ID "name," the requirement is "required," the inputMechanism is "TextField," the displayOrder is "1," the access indicator is "ReadOnly," and "resourceName" is the default value.

The recommendations 726 can include recommendations that can be made regarding the resource. In some embodiments, a recommendation 726 is listed with two descriptors: an ID and an actionID. In the example shown, increaseVolumeSize is an ID with actionID extendVolume. In the example shown, recommendations can be made regarding whether (and how much) to increase the size of a volume, whether (and how much) to extend the size of a volume, whether (and how much) to volume is being wasted, whether (and when) to migrate a volume, and whether to check a status of the volume. The recommendations can be helpful for performing system analytics on storage platforms and maintaining the system. For brevity, alerts and symptoms are not populated in the example shown. Whether actions, recommendation, alerts, and symptoms are populated depends on a particular application, for example, when the subset is relevant for a particular resource.

In one aspect, the file 700 responds to client queries by identifying and assembling parameters for carrying out particular operations. For example, the file 700 can include parameters relevant to actions performed on a volume. The parameters can be useful for making an API call to extend the volume. The action may be carried out by an external component. For example, the action extendVolume 724 includes metrics and parameters needed to make an API call to perform a volume-extending function. Traditionally, the gathering of parameters and relating parameters and metrics to perform the function is laborious because it requires handwritten code, sometimes thousands of lines of code. The DSL file 700 simplifies coding by relating parameters needed for a particular function. The DSL file can be used in conjunction with the externally coded function to carry out an action, thus reducing the amount of handwritten code needed to carry out the function.

The file 700 can also include topology section 760. The topology section 760 defines relationships between resources. For example, a volume is in a many-to-one relationship with an)(Brick, a volume is in a many-to-many relationship with a cluster, etc., a volume is in a one-to-many relationship to a snapshot, and a snapshot is in a many-to-one relationship with a cluster. This information can be useful for visualizing a topology graph and the relationships between resources. For example, this information can be used by a client application to render a graphic representing the topology on a user interface.

The file 700 is parsed and a representation based on the file is generated. The parsing is further described herein with respect to FIG. 6. In some embodiments, the output of the file parsing is more specific than an adapter output. In some embodiments, the output of the file parsing is a set of objects that are applicable to a client application, allowing the client application to model and/or export a topology. For example, the client application can render the topology on a user interface.

FIG. 8 illustrates an example of generated properties code 800 for modeling and exporting information about a storage platform. The techniques disclosed herein advantageously provide easier localization compared with conventional techniques. For example, the generated code can be adapted to various languages and regions (e.g., geographical) with simple changes. Code can be adapted for a specific region or language by automatically adding locale-specific components and substituting previously translated text. After code is generated from a DSL file according to the techniques described herein, a properties file 800 can be created. The properties file 800 can contain user-facing strings that might be presented. The generated code 800 allows strings to be defined, where the string content is determined by an end-user's locale.

For example, a recommendation 802 for metric "Volume" is increaseVolumeSize. In the example shown, the user-facing string is "Increase the capacity of the Volume." This user-facing string can be adapted to an end-user's locale. If the user reads Spanish rather than English, the user-facing string can be adapted accordingly to read: "Aumentar la capacidad del Volumen." The generated code 800 can automatically generate the user-facing string adapted to the user's particular language and/or locale.

The techniques described herein reduce the effort required to develop middleware by reducing the amount of handwritten code to generate middleware. In some instances, the amount of handwritten code is around 20% to 50% of handwritten code in conventional middleware. The present techniques increase reliability, speed, and stability of middleware. Moreover, the disclosed techniques allow for support to be quickly added or updated, which improves a user experience and allows for more products to be sold or licensed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating a middleware custom model, comprising:
receiving a storage platform description expressed at least in part in a domain specific language, wherein the storage platform description describes a storage platform and includes a translation rule defining how the middleware custom model exports information and the storage platform description correlates adapter-generated code with at least one object output by a storage platform;
applying the translation rule to the storage platform description, wherein the translation rule includes at least one export rule defining export of a class into a target third party data structure;
programmatically generating, based at least in part on the application of the translation rule to the storage platform description, the middleware custom model configured to transform response data received from the storage platform to conform to the target third party data structure of a third party application with which the response data is associated including by creating a representation of a raw code model using raw data output by the storage platform and individual objects obtained from an adapter; and
creating a properties file containing user-facing strings, wherein the properties file associates a resource parameter with a user-facing string, and content of the user-facing string is replaceable to accommodate a language associated with a geographical location of a user.

2. The method of claim 1, further comprising:
obtaining an output of storage platform resources; and
systematically correlating the description in the domain specific language and the output of the storage platform resources.

3. The method of claim 1, wherein the storage platform description includes at least one of: resource topology, an action, a metric, an alert, an attribute, of the storage platform.

4. The method of claim 1, further comprising generating an intermediate model mapping the response data received from the storage platform to a representation of the target third party data structure, wherein the intermediate model includes the adapter-generated code.

5. The method of claim 4, further comprising providing at least one translation rule to map the received response data to the target third party data structure.

6. The method of claim 1, wherein the response data received from the storage platform is associated with a request from the third party application.

7. The method of claim 1, wherein the storage platform description includes a topology file.

8. The method of claim 7, wherein the topology file includes a representation of storage platform resources and at least one of: associated metrics, recommendation, and alerts.

9. The method of claim 7, wherein the topology file includes a topology description representing correspondence between member devices making up the storage platform.

10. The method of claim 9, wherein the topology description is readable by the third party application to render a representation of a topology of the storage platform on a graphical user interface.

11. The method of claim 1, wherein the storage platform includes a storage array.

12. The method of claim 1, wherein the generating the middleware custom model includes outputting code embodying a custom model.

13. The method of claim 1, wherein the generating the middleware custom model is responsive to a request by the third party application.

14. The method of claim 13, wherein the third party application and the storage platform use communication protocols different from each other.

15. The method of claim 1, wherein the generated middleware custom model includes Java code.

16. The method of claim 1, wherein the generated middleware custom model includes generic source code applicable to the storage platform.

17. The method of claim 1, wherein output of the storage platform includes code generated by an adapter.

18. The method of claim 1, wherein the storage platform description is regenerated in response to a change in at least one of the storage platform and the third party application and the programmatically generating is adapted to the change.

19. A system for generating a middleware custom model, comprising:
a processor configured to:
receive a storage platform description expressed at least in part in a domain specific language, wherein the storage platform description describes a storage platform and includes a translation rule defining how the middleware custom model exports information and the storage platform description correlates adapter-generated code with at least one object output by a storage platform;
apply the translation rule to the storage platform description, wherein the translation rule includes at least one export rule defining export of a class into a target third party data structure;
programmatically generate, based at least in part on the application of the translation rule to the storage platform description, the middleware custom model configured to transform response data received from the storage platform to conform to the target third party data structure of a third party application with which the response data is associated including by creating a representation of a raw code model using raw data output by the storage platform and individual objects obtained from an adapter; and
create a properties file containing user-facing strings, wherein the properties file associates a resource parameter with a user-facing string and content of the user-facing string is replaceable to accommodate a language associated with a geographical location of a user; and
a memory coupled to the processor and configured to provide the processor with instructions.

20. The system of claim 19, wherein the generating the middleware custom model includes outputting code embodying a custom model and responsive to a query by a client application.

21. A computer program product, the computer program product being embodied in a non-transitory computer readable storage medium and comprising computer instructions for:
receiving a storage platform description expressed at least in part in a domain specific language, wherein the storage platform description describes a storage platform and includes a translation rule defining how the middleware custom model exports information and the storage platform description correlates adapter-generated code with at least one object output by a storage platform;
applying the translation rule to the storage platform description, wherein the translation rule includes at least one export rule defining export of a class into a target third party data structure;
programmatically generating, based at least in part on the application of the translation rule to the storage platform description, the middleware custom model configured to transform response data received from the storage platform to conform to the target third party data structure of a third party application with which the response data is associated including by creating a representation of a raw code model using raw data output by the storage platform and individual objects obtained from an adapter; and
creating a properties file containing user-facing strings, wherein the properties file associates a resource parameter with a user-facing string, and content of the user-facing string is replaceable to accommodate a language associated with a geographical location of a user.

22. The method of claim 1, wherein the individual objects are output response objects annotated and parsed from the storage platform by the adapter, and data structures are created by the adapter based at least in part on the individual objects for consumption by the middleware custom model.

23. The method of claim 1, wherein the middleware custom model is further configured to generate metrics about the storage platform based at least in part on the correlation of the adapter-generated code with at least one object output by a storage platform.

24. The method of claim 1, wherein the translation rule translates a raw volume into a volume with metrics and associated actions.

25. The method of claim 1, wherein the translation rule defines how to export an instance of a generated class type into the target third party data structure.

26. The method of claim 1, wherein the middleware custom model is programmatically generated in response to compiling the storage platform description.

* * * * *